United States Patent
Cordaillat et al.

(10) Patent No.: US 7,568,512 B2
(45) Date of Patent: Aug. 4, 2009

(54) DEVICE FOR LAYING REINFORCEMENT CORD

(75) Inventors: Dominique Cordaillat, Brindas (FR); Jean-Louis Souche, Taluyers (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 407 days.

(21) Appl. No.: 11/455,384

(22) Filed: Jun. 19, 2006

(65) Prior Publication Data

US 2007/0012405 A1    Jan. 18, 2007

Related U.S. Application Data

(60) Provisional application No. 60/702,489, filed on Jul. 26, 2005.

(30) Foreign Application Priority Data

Jun. 17, 2005    (FR) .................................. 05 06246

(51) Int. Cl.
*B29D 30/38* (2006.01)
*B29C 70/38* (2006.01)
(52) U.S. Cl. .................... 156/397; 156/117; 156/177
(58) Field of Classification Search ................ 156/117, 156/130, 397, 177, 178
See application file for complete search history.

(56) References Cited

U.S. PATENT DOCUMENTS

| | | | |
|---|---|---|---|
| 4,062,716 A | 12/1977 | Galantine et al. | |
| 4,279,683 A | 7/1981 | Landsness et al. | |
| 5,281,289 A | 1/1994 | Debroche et al. | |
| 6,702,913 B2 * | 3/2004 | Marchini et al. | 156/117 |
| 6,887,327 B2 * | 5/2005 | Mayet | 156/117 |
| 2003/0025238 A1 | 2/2003 | Ogawa | |

FOREIGN PATENT DOCUMENTS

| | | |
|---|---|---|
| EP | 1 279 486 A | 1/2003 |
| JP | 2005 246845 A | 9/2005 |

* cited by examiner

*Primary Examiner*—Geoffrey L Knable
(74) *Attorney, Agent, or Firm*—Cohen Pontani Lieberman & Pavane LLP

(57) ABSTRACT

A device for laying reinforcement cords (41) of a tire. The device is formed of a first frame (1) comprising a motor-driven shaft (10) with an axis XX', the motor-driven shaft (10) supporting a reference form on which the blank (4) of the tire rests. The first frame (1) itself is mounted rotatably about an axis ZZ' on a second frame (2) in such a manner that the axis ZZ' has a point of intersection with the axis of rotation XX' and belongs to the equatorial plane (E) of the blank (4) or of the reference form on which the blank rests. A third frame (3) is rigidly connected to the second frame (2), the third frame (3) supporting an apparatus (13) for laying the lengths of cords (41) by projection of the lengths of cords directly into their final position on the receiving surface formed by the tire blank (4).

17 Claims, 3 Drawing Sheets

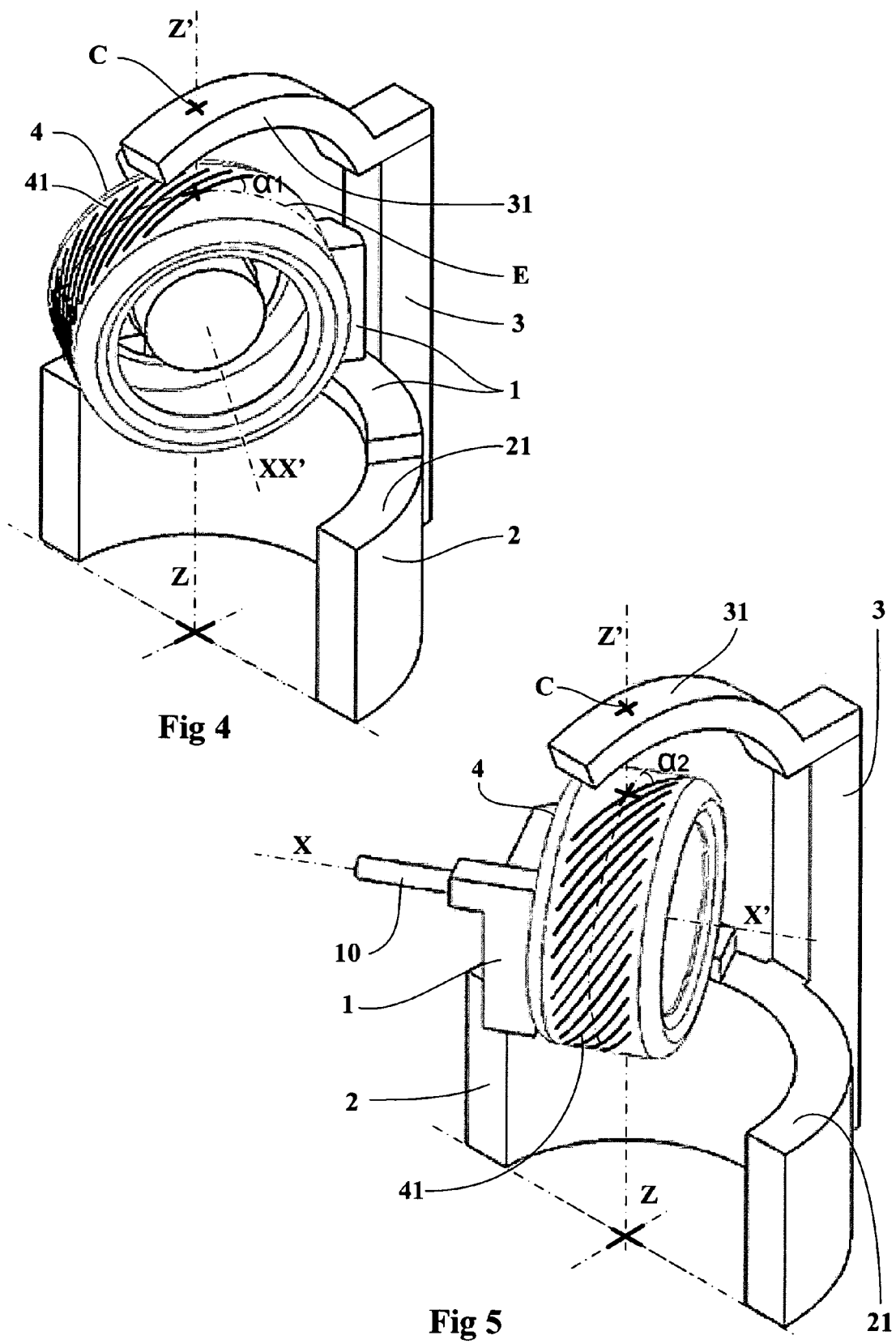

DEVICE FOR LAYING REINFORCEMENT CORD

RELATED APPLICATIONS

This application claims priority from French patent application no. 05/06246 filed Jun. 17, 2005 and U.S. Provisional patent application Ser. No. 60/702,489 filed Jul. 26, 2005.

FIELD OF THE INVENTION

The invention relates to the manufacture of tires intended to equip vehicles. In general, this manufacture is carried out by laying on a reference form the different components forming the tire. These components or semi-finished products are formed from rubber profiles or from reinforcing elements supplied from laying devices specialized according to the type of component. More precisely, the invention relates to the device for manufacturing the reinforcement armatures crown belt of tires. These reinforcements are formed of cords or lengths of cords which are parallel with one another and are disposed in the tire crown, under the tread.

BACKGROUND OF THE INVENTION

The manufacture of such reinforcements is effected conventionally by forming angled plies, in which the reinforcement cords form a specified angle with the longitudinal direction of the ply, and which are prepared flat in the form of semi-finished products which are laid by winding over a reference form during assembly of the tire. The reference form is generally mounted on a frame having means for setting the same in rotation.

Another manner of proceeding includes laying cords or lengths of cords directly in their final place on the laying form or tire blank. Apparatus permitting this type of manufacture is described by way of non-limiting example in the publications EP 0 519 295, EP 580 055, EP 1 231 049, or even EP 1 426 170, which describe laying apparatuses wherein the reinforcement cord is laid by a cord guide carried by a rotary or oscillating laying arm and is then stuck into position on the laying form by applicators, or in the publications EP 0 248 301, EP 0 845 348 or EP 0 845 349 which describe laying apparatuses wherein the reinforcement cords are projected individually on to the element defining the reinforcement geometry. A cord guide can make it possible to adjust the final trajectory of the length of cord so as to improve reproducibility and precision of laying.

The invention relates in particular to laying apparatuses such as those described above.

These apparatuses comprise means of calling for cord from a source such as a spool, and have in common that the cord or lengths of cords are set in motion in space in a laying plane whose intersection with the laying form or tire blank forms a line, part of which coincides with the cord or the length once laid.

The term cord must be understood in an entirely general manner and comprises cords in the form of monofilaments, multifilaments, a cable, a plied yarn or equivalent assembly, whatever the material forming the cord or the surface treatment used to enhance its bonding with the rubber or to allow its adhesion direct to the support during projection.

So as to realise positioning of the cords or lengths of cords, in conformity with the structure of the tire, it is advantageous to lay them on the tire blank according to one position (generally centred relative to the equator of the torus formed by the tire blank), and at a specified angle relative to the longitudinal direction.

The direction of the cord, once laid, makes a specified angle $\alpha$ with the circumferential direction of the tire. This angle $\alpha$ may vary from 0 to 90°. However, in the particular case of crown reinforcements, the angle $\alpha$ is between 15° and 40°. Furthermore, the device for laying lengths of cord of the type described above must be aligned on the one hand with the centre of the tire blank placed on the reference form, and on the other hand oriented precisely relative to the circumferential direction so as to lay the cords or lengths of cords at the desired angle $\alpha$ and in the prescribed position.

To this end, the apparatus for laying lengths of cord is mounted on a frame via an articulated system which is capable, for the purposes of adjustment, to make the apparatus for laying the cords or lengths of cords rotate by a specified angle $\alpha$ about a virtual axis ZZ'. The frame supporting the laying device is aligned geometrically with the frame supporting the reference form.

The axis ZZ', about which the laying apparatus revolves, is generally contained in the equatorial plane of the tire blank or of the form acting as a reference for the same, and intersects perpendicularly with the virtual axis of rotation XX' of the reference form at a specified point. The equatorial plane E is defined as being the plane passing through the axial centre of the blank or of the form acting as a reference and being perpendicular to the axis of rotation XX' of the blank or reference form. In general, when a radial section of a tire blank or form is observed, the point most remote from the axis of rotation and located on the surface of the tire blank or form XX' belongs to the equatorial plane.

Although this mode of setting up the device for laying cords is satisfactory by virtue of its low bulk and excellent ease of integration with the other laying devices, it is nevertheless difficult to adjust and keep in a specified position with the required degree of precision for laying of the cord or lengths of cords.

It is found in fact that the presence of articulations and arms which are necessary for controlling the rotary movement of the laying apparatus about the axis ZZ' brings about an accumulation of mechanical play which leads to some imprecision in the positioning of the cord in space, which may in turn lead to a variation in the angular position of the cords or lengths of cords of the order of some degrees. This imprecision is incompatible with the industrial standard of precision and reliability sought for the manufacture of high-performance tires. This imprecision may also be aggravated by the heavy mechanical stress generated by the rapid rotation of the elements of the apparatus for laying cords or lengths of cord, which is transmitted to the frame supporting the laying apparatus via control arms and articulations.

SUMMARY OF THE INVENTION

One object of the invention is to provide a machine structure which offers improved angular positioning precision whilst retaining the ease of integration of this new device with other devices for supplying components and semi-finished products.

The device for laying cord or lengths of cord according to an aspect of the invention comprises a first frame having a motor-driven shaft with an axis XX', the motor-driven shaft supporting the reference form intended to receive the tire blank. This first frame is mounted adjustably by rotation about an axis ZZ' on a second frame so that the axis ZZ' belongs to the equatorial plane E of the reference form and intersects perpendicularly with the axis XX'. The apparatus for laying cord or lengths of cord is mounted on a third frame positioned in a fixed manner relative to the second frame. The laying apparatus is disposed so that the plane of deposition of cords includes the axis ZZ'.

In this configuration, by making the first frame supporting the reference form of the blank perform a rotation by a specified angle α relative to the third frame supporting the apparatus for laying lengths of cords, the laying angle of the lengths of cords on the tire blank is determined.

Thus, by making the position of the apparatus for laying cords fixed relative to the second frame, the disadvantages associated with the means necessary for its orientation are overcome and it is possible to obtain a laying precision of the cords which is far superior to that obtained by implementing known means.

It appears that the simplest embodiment includes positioning the axis of rotation of the form horizontally and the virtual axis of rotation ZZ' vertically.

BRIEF DESCRIPTION OF THE DRAWINGS

The description below is based on an embodiment given by way of non-limiting example, with reference to the FIGS. 1 to 6, in which.

DETAILED DESCRIPTION OF THE DRAWINGS

Identical elements shown in the above figures have identical references. The drawings are based in a non-limiting manner on a laying apparatus such as described in the patents EP 0 248 301, EP 0 845 348 and EP 0 845 349, in which the cord is projected on to the receiving surface formed by the tire blank.

Figure 1:
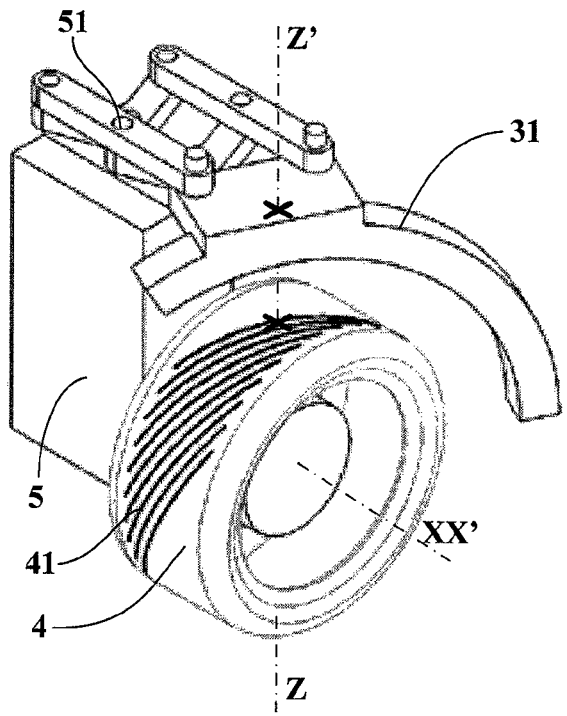
FIGS. 1 and 2 show diagrammatic perspective views of a device for laying reinforcement cords according to the prior art.
Figure 3:
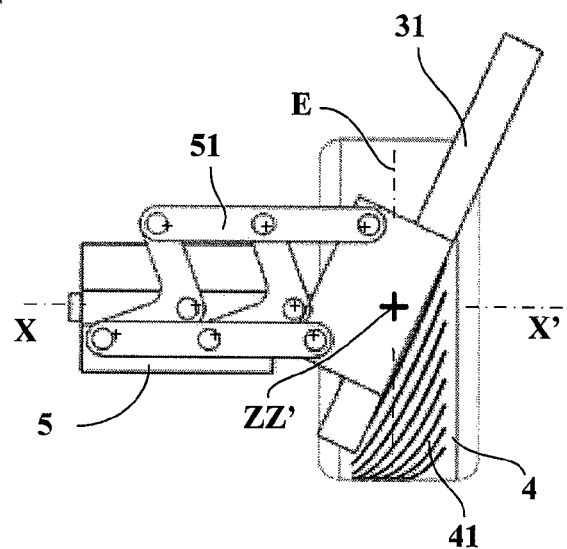
FIG. 3 shows a diagrammatic plan view of the device shown in FIGS. 1 and 2, FIGS. 4 and 5 show diagrammatic perspective views of a device for laying reinforcement cords in accordance with the invention.
Figure 2:
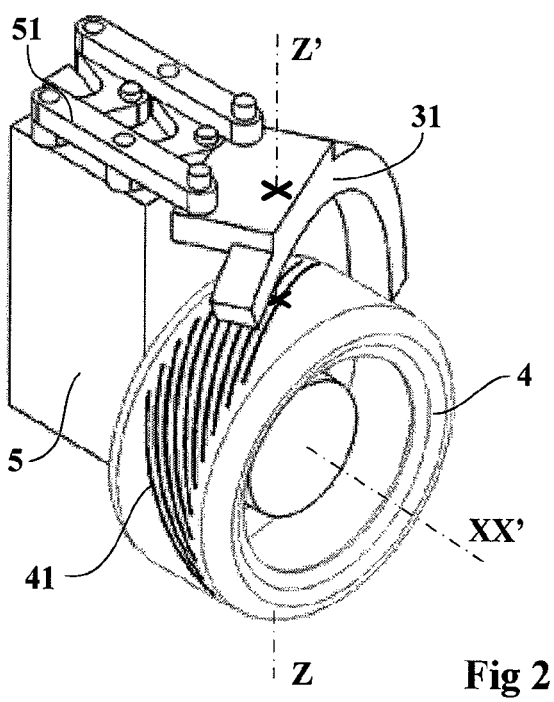

FIGS. 1, 2 and 3 show an embodiment known from the prior art, in which a frame 5, generally fixed, comprises a motor-driven shaft with an axis XX' supporting the reference form on which the tire blank 4 rests. The apparatus for laying cords 31, shown diagrammatically, is connected to the frame 5 by an assembly 51 of rocker bars connected by articulations permitting rotation of the laying apparatus 31 about a virtual axis ZZ'. The axis ZZ' passes through the centre of rotation of the laying apparatus 31 and intersects with the axis of rotation XX' of the shaft carrying the reference form on which the tire blank 4 rests. This axis ZZ' is also included in the equatorial plane, whose intersection with the outer surface of the blank 4 takes the form of a circumference whose outline is represented by the reference E.

After the cord has been laid, the tire blank effects a rotation at a specified rate about its axis of rotation XX', before the next length of reinforcement cord is laid.

The angle α of laying of the reinforcement cords 41 is specified by the rotation about the axis XX' of the laying apparatus 31 under the action of the rocker bars 51. The large number of points of rotation of this articulated system, heavily stressed by the mechanical vibrations associated with the functioning of the apparatus for laying reinforcement cords 31, gives rise to imprecision in laying lengths of cord, which is incompatible with the demands required.

Figure 6:
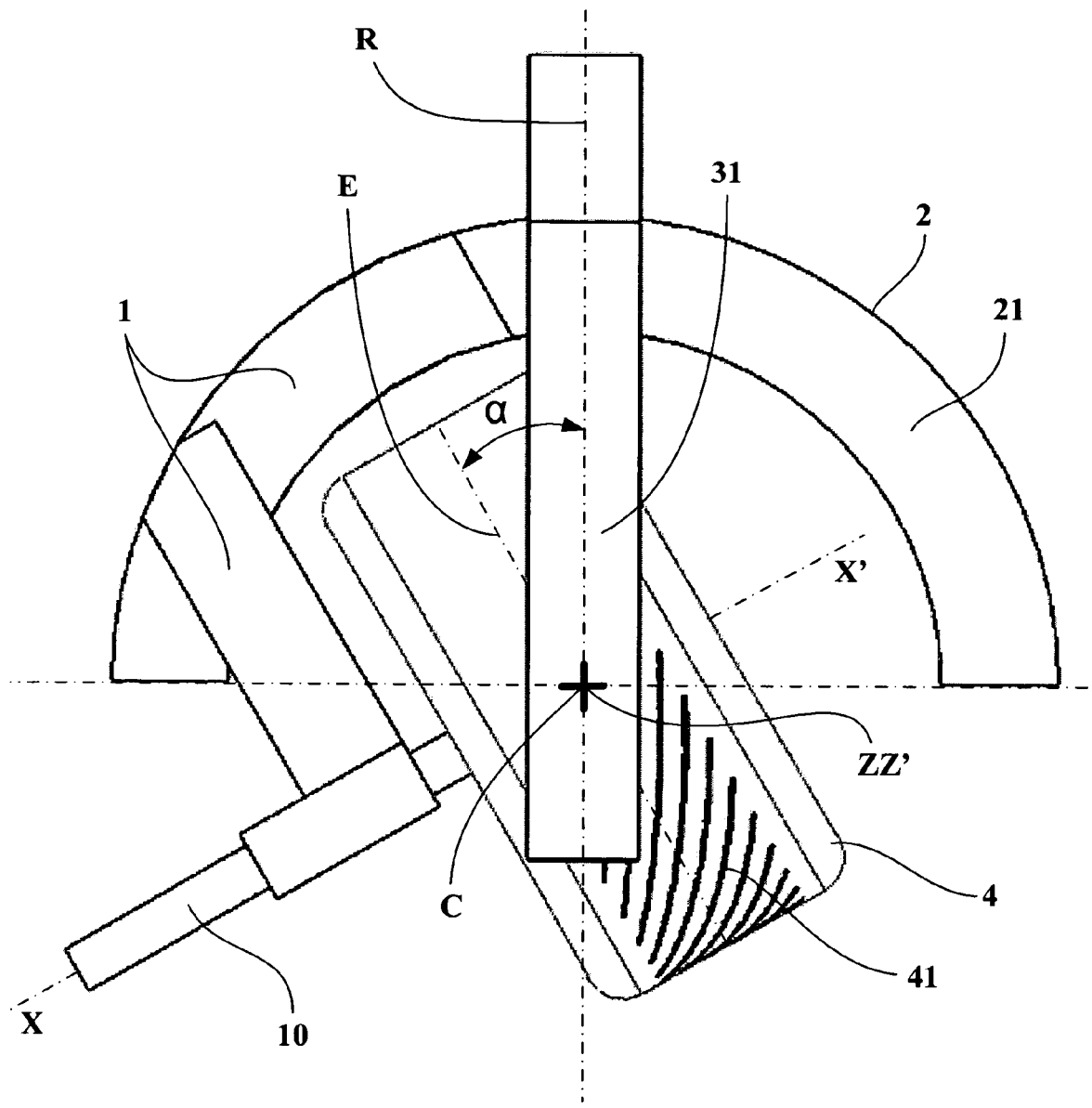
FIG. 6 shows a diagrammatic plan view of the device shown in FIGS. 4 and 5.

The laying device according to an aspect of the invention, as is illustrated in FIGS. 4, 5 and 6, is composed of a first frame 1, comprising a motor-driven shaft 10 rotating about an axis XX'. The reference form (not shown) supporting the tire blank 4 is mounted on the shaft 10. The equatorial plane is represented by the line E of its intersection with the outer surface of the tire blank 4. The axis ZZ' is disposed in the equatorial plane of the tire and intersects perpendicularly with the axis XX' at a point in space.

The second frame 2 comprises a guide path 21 which is disposed in a horizontal plane perpendicular to the axis ZZ', and on which the first frame 1 circulates. It is arranged that the axis ZZ' passes through the centre of the arc of a circle formed by the guide path 21. Thus, by making the frame 1 circulate along the guide path 21, it is possible to change the angle α formed by the equatorial plane of the tire blank with a vertical reference plane passing through the axis XX'. The connection of the first frame 1 to the second frame 2 can be effected by a guide rail or any other type of connection capable of guiding the first frame along the guide path 21.

A third frame 3 is rigidly connected to the second frame 2. This third frame supports the apparatus for laying reinforcement cords 31. This arrangement can therefore make the laying apparatus 31 fixed with respect to the second frame 2.

For the convenience of adjusting the device, and as has already been mentioned, the axis ZZ' is placed in the vertical direction, and the axis XX' in the horizontal direction. Thus the equatorial plane E and the laying plane are each vertical planes forming an angle α between them.

The reference plane R of the adjustment of the laying angle α formed by the reinforcement cords, once these are placed with the circumferential direction of the tire, can be determined by selecting a vertical plane R passing through the axis ZZ' and through the centre C of the laying apparatus 31 (see FIG. 6).

Thus in order that the angle α is equal to the prescribed value, it suffices to move the first frame 1 along the guide path so that the equatorial plane of the tire blank forms with the reference plane of adjustment R an angle equal to the angle α. FIGS. 4 and 5 show the positioning of the first frame required in order to lay the reinforcement cords at an angle α1 or α2.

The embodiment of this device incorporating an apparatus 31 for laying cords of the type described in a non-limiting manner in the publications cited in the introduction to the present description has the advantage of doing away with all the mobile guide elements necessary for positioning the laying apparatus relative to the tire blank, since this positioning is effected by moving the first frame 1 relative to the laying apparatus 31, which remains fixed.

The mechanical stresses to which the first frame 1 is subjected are relatively slight, and not detrimental to the quality of positioning. Thus, it is much easier to control positioning of the apparatus for laying reinforcement cords and to control the movement of the reinforcement cords in space with the required precision.

Other embodiments (not shown) make it possible to create a device according to the invention giving equivalent results. Thus it is entirely possible to make the first frame 1 rest on the second frame 2 via a rotary shaft whose axis merges with the axis ZZ'.

Furthermore, the arrangement of the device for laying reinforcement cords in a larger assembly comprising the other devices for supplying the other components of the tire can be realized in plural ways. A first arrangement consists in bringing the laying devices for different components close to the blank, whose frame remains fixed relative to these other devices, which in this case amounts to making the second frame fixed 2.

Another arrangement includes moving the blank during manufacture to the right of each of the laying devices, which amounts in this case to making the second frame 2 mobile in one or more specified directions.

We claim:

1. A device for laying reinforcement cords of a tire, the device comprising:
    a first frame comprising a motor-driven shaft with an axis XX', the motor-driven shaft supporting a rotary reference form which is intended to receive a blank of the tire;
    a second frame having a semicircular guide path on which the first frame circulates and rotates adjustably by a specified angle α about an axis ZZ' passing through a center of the semicircular guide path disposed in a plane substantially perpendicularly to the axis ZZ', so that the axis ZZ' is included in an equatorial plane (E) of the reference form and intersects perpendicularly with the axis XX'; and
    a third frame which is fixed relative to the second frame and supports an apparatus for laying cords or lengths of cords directly and in their final position on a receiving surface formed by the blank of the tire, the third frame being disposed in such a manner that the cords or lengths of cord move toward the receiving surface in a laying plane including the axis ZZ'.

2. The device according to claim 1, wherein the axis XX' is horizontal and the axis ZZ' is vertical.

3. The device according to claim 2, wherein the cords or lengths of cord, once laid, are adjacent and substantially parallel to one another.

4. The device according to claim 2, wherein the cords or lengths of cords, once laid, form a specified angle α with the circumferential direction of the tire.

5. The device according to claim 1, wherein the first frame and the second frame are connected by a rotary shaft whose axis merges with the axis ZZ'.

6. The device according to claim 5, wherein the cords or lengths of cord, once laid, are adjacent and substantially parallel to one another.

7. The device according to claim 5, wherein the cords or lengths of cords, once laid, form a specified angle α with the circumferential direction of the tire.

8. The device according to claim 1, wherein the laying apparatus projects each cord or length of cord individually onto its final position on the tire blank.

9. The device according to claim 8, wherein the cords or lengths of cord, once laid, are adjacent and substantially parallel to one another.

10. The device according to claim 8, wherein the cords or lengths of cords, once laid, form a specified angle α with the circumferential direction of the tire.

11. The device according to claim 1, wherein the laying apparatus comprises a cord guide supported by a rotary or oscillating laying arm, and means for applying the cord to the laying form.

12. The device according to claim 11, wherein the cords or lengths of cord, once laid, are adjacent and substantially parallel to one another.

13. The device according to claim 11, wherein the cords or lengths of cords, once laid, form a specified angle α with the circumferential direction of the tire.

14. The device according to claim 1, wherein the cords or lengths of cord, once laid, are adjacent and substantially parallel to one another.

15. The device according to claim 14, wherein the cords or lengths of cords, once laid, form a specified angle α with the circumferential direction of the tire.

16. The device according to claim 1, wherein the cords or lengths of cords, once laid, form a specified angle α with the circumferential direction of the tire.

17. The device according to claim 16, wherein the cords or lengths of cord, once laid, are adjacent and substantially parallel to one another.

* * * * *